United States Patent
Choi et al.

(10) Patent No.: US 8,275,072 B2
(45) Date of Patent: Sep. 25, 2012

(54) COGNITIVE RADIO COMMUNICATION DEVICE FOR PERFORMING SPECTRUM SENSING AND DATA COMMUNICATION

(75) Inventors: Hyun Ho Choi, Suwon-si (KR); Kyung Hun Jang, Suwon-si (KR); Hyo Sun Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 12/424,995

(22) Filed: Apr. 16, 2009

(65) Prior Publication Data

US 2010/0086010 A1 Apr. 8, 2010

(30) Foreign Application Priority Data

Oct. 2, 2008 (KR) .................. 10-2008-0097055

(51) Int. Cl.
*H03K 9/00* (2006.01)
(52) U.S. Cl. .................................................. 375/316
(58) Field of Classification Search .................. 375/316
See application file for complete search history.

(56) References Cited

U.S. PATENT DOCUMENTS

| | | | |
|---|---|---|---|
| 8,059,694 B2* | 11/2011 | Junell et al. .................. 375/137 |
| 2007/0091998 A1 | 4/2007 | Woo et al. | |
| 2007/0291636 A1* | 12/2007 | Rajagopal et al. ............ 370/208 |
| 2008/0090581 A1 | 4/2008 | Hu | |
| 2008/0166974 A1* | 7/2008 | Teo et al. .................. 455/67.11 |
| 2008/0207136 A1* | 8/2008 | Tang et al. .................. 455/73 |
| 2009/0117859 A1* | 5/2009 | Smith et al. .................. 455/78 |
| 2010/0246434 A1* | 9/2010 | Wang et al. .................. 370/253 |
| 2011/0111711 A1* | 5/2011 | Bo .................. 455/127.1 |

FOREIGN PATENT DOCUMENTS

KR 10-2005-0034116 4/2005

OTHER PUBLICATIONS

Y. Hur, J. Park, W. Woo, K. Lim, C.-H. Lee, HS. Kim and J. Laskar, "A wideband analog multi-resolution spectrum sensing (MRSS) technique for cognitive radio (CR) systems," IEEE, pp. 4090-4093, Jun. 2006.

Kyutae Lim et al., "Spectrum sensing technologies for cognitive radio based interactive broadcasting services," Journal of Broadcasting Engineers, pp. 68-77, 2006.

J. Park, Y. Hur, T. J. Song, K. Kim, J. Lee, K. Lim, C.-H. Lee, H. S. Kim, and J. Laskar, "Implementation issues of a wideband multi-resolution spectrum sensing (MRSS) technique for cognitive radio (CR) systems," IEEE, 5 pages, Jun. 2006.

* cited by examiner

*Primary Examiner* — Juan A Torres
(74) *Attorney, Agent, or Firm* — NSIP Law

(57) ABSTRACT

A cognitive radio communication device including at least two radio frequency (RF) chains is provided. In order to perform a feature detection, the cognitive radio frequency device may reduce or eliminate a quiet time where a data communication is suspended using the at least two RF chains. While one RF chain performs the feature detection, another RF chain may perform the data communication.

12 Claims, 7 Drawing Sheets

COGNITIVE RADIO COMMUNICATION DEVICE FOR PERFORMING SPECTRUM SENSING AND DATA COMMUNICATION

CROSS-REFERENCE TO RELATED APPLICATION

This application claims the benefit under 35 U.S.C. §h119(a) of a Korean Patent Application No. 10-2008-0097055, filed on Oct. 2, 2008, in the Korean Intellectual Property Office, the entire disclosure of which is incorporated herein by reference.

BACKGROUND

1. Field

The following description relates to technology that enables a second communication system to appropriately use all or a portion of radio resources that are allocated to a first communication system.

2. Description of Related Art

Much research is currently underway involving technologies that efficiently use limited frequency resources. Cognitive radio ("CR") technology is in the spotlight.

In order to more efficiently use limited frequency resources, a "cognitive radio system," or a "second communication system" using the cognitive radio technology may use frequency resources allocated to a "first communication system."

For example, according to cognitive radio technology, a second base station or a second terminal that belongs to the second communication system recognizes all or a portion of at least one frequency resource allocated to the first communication system as an available frequency resource and performs a data communication using the recognized available frequency resource.

However, the first communication system has priority with respect to the available frequency resource. Accordingly, where a signal of the second communication system may collide with a signal of the first communication system, the second base station and the second terminal may need to stop the data communication or change a using frequency resource to another frequency resource.

The second base station or the second terminal may perform an "energy detection" or a "feature detection" for a received signal in order to determine whether the signal of the first communication system exists.

SUMMARY

In one general aspect, a cognitive radio communication device includes a first radio frequency chain including a data communication unit to communicate in an in-band and an energy detector to detect an energy of a received first signal in the in-band; and a second radio frequency chain including a feature detector to perform a feature detection of a received second signal in the in-band.

The data communication unit may communicate independently of the feature detector.

The feature detector may receive information associated with a transmission signal transmitted by the data communication unit, and the feature detector may extract the transmission signal from the received second signal and performs the feature detection of the received second signal.

The second radio frequency chain may further include a backup channel energy detector to detect an energy of the received second signal in an out-of-band and attain a backup channel.

The feature detector may detect the received second signal in the out-of-band depending on the energy detection of the received second signal in the out-of band by the backup channel energy detector.

The feature detector may detect the received second signal in the in-band depending on an energy detection result determined by the energy detector of the received first signal in the in-band.

The energy detector may compare a predetermined threshold with an energy of the received first signal, and the predetermined threshold may be adjustable.

The threshold may be adjusted according to a probability of interference in a first communication system.

The cognitive radio communication device may further include a media access control (MAC) processor schedules the in-band or a pre-attained channel based on a feature detection result determined by the feature detector of the received second signal in the in-band.

The MAC processor may schedule a change from the in-band to the pre-attained channel where the feature detector detects a signal of a first communication system in the received second signal.

The cognitive radio communication device may further include a separation module to physically separate the first radio frequency chain and the second radio frequency chain.

In another general aspect, a cognitive radio communication device includes a first radio frequency chain including a data communication unit to communicate in an in-band; and a second radio frequency chain including an energy detector to perform an energy detection of a received signal in the in-band and a feature detector to perform a feature detection of the received signal in the in-band based on an energy detection result by the energy detector of the received signal in the in-band.

The data communication unit may communicate independently of the feature detector.

The feature detector may receive information associated with a transmission signal transmitted by the data communication unit, and the feature detector may extract the transmission signal from the received signal and performs the feature detection of the received signal.

The second radio frequency chain may further include a backup channel energy detector that performs an energy detection of the received signal in an out-of-band and that attains a backup channel based on an energy detection result of the received signal in the out-of-band.

The feature detector may perform the feature detection for the received signal in the out-of-band depending on the detection result of the backup channel energy detector.

The cognitive radio communication device may further include a MAC processor that schedules the in-band or a pre-attained channel based on the detection of the received signal in the in-band by the feature detector.

The MAC processor may perform scheduling for the in-band or the pre-attained channel to change from the in-band to the pre-attained channel where the feature detector detects a signal of a first communication system in the received signal.

The cognitive radio communication device may further include a separation module to physically separate the first radio frequency (RF) chain and the second RF chain.

The energy detector may detect an energy result of the received signal in an out-of-band, and the feature detector may perform the feature detection for the received signal in the out-of-band depending on the energy detection result.

The cognitive radio communication device also may further include a MAC processor that schedules the out-of-band or a pre-attained channel based on the detection of the received signal in the out-of-band by the feature detector.

The MAC processor may perform scheduling for the out-of-band or the pre-attained channel to change the out-of-band to the pre-attained channel where the feature detector detects a signal of a first communication system in the received signal.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
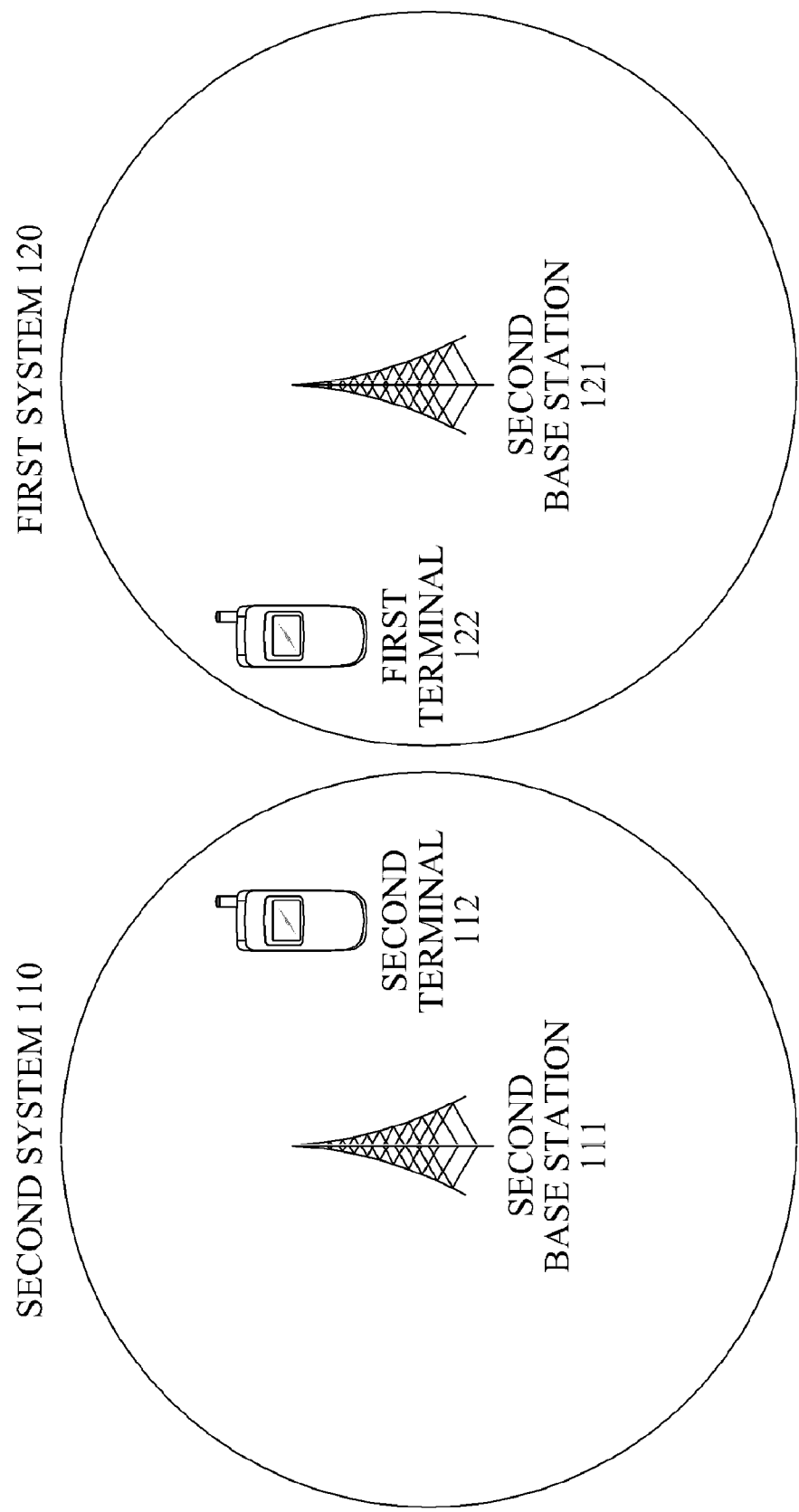
FIG. 1 is a diagram illustrating an exemplary communication system including a first system and a second system.

FIG. 1 illustrates an exemplary communication system including a first system 120 and a second communication system 110. The second communication system 110 includes a second base station 111 and a second terminal 112. The first communication system 120 includes a first base station 121 and a first terminal 122.

The second communication system 110 recognizes an available frequency resource among at least one frequency resource in the first communication system 120 using cognitive radio technology. Data is transmitted and received between the second base station 111 and the second terminal 112 of the second communication system 110 using the available frequency resource. Hereinafter, all communication devices belonging to the second communication system 110 such as the second base station 111 and the second terminal 112 will be referred to as "a cognitive radio communication device."

Where the first communication system 120 and the second communication system 110 use the same at least one frequency resource, a collision may occur between the first communication system 120 and the second communication system 110. However, the first communication system 120 may have priority with respect to the at least one frequency resource. Accordingly, the second communication system 110 may use all or a portion of the at least one frequency resource allocated to the first communication system 120 under a condition that the second communication system 110 may not disturb communication operations of the first communication system 120. The second base station 111 and the second terminal 112 may sense a signal of the first communication system 120 and perform a data communication based on the sensed result. For example, where the signal of the first communication system 120 does not exist or where an interference, due to the data communication between the second base station 111 and the second terminal 112, occurs in the first communication system 120 and reaches a level that is less than or equal to a particular level, the second base station 111 and the second terminal 112 may use all or a portion of the at least one frequency resource allocated to the first communication system 120.

In order to determine whether the signal of the first communication system 120 exists, the second base station 111 or the second terminal 112 may initially perform fast sensing in an in-band, based on a corresponding received signal of the second base station 111 or the second terminal 112. For example, the second base station 111 or the second terminal 112 may compare an energy of the received signal with a predetermined reference value to determine whether the signal of the first communication system 120 exists. The above "fast sensing" is referred to as an "energy detection."

Where the energy of the received signal is less than the predetermined reference value, the second base station 111 or the second terminal 112 determines that the signal of the first communication system 120 does not exist in the in-band. In such case, the second base station 111 or the second terminal 112 may continuously perform the data communication.

Where the energy of the received signal is greater than or equal to the predetermined reference value, the second base station 111 or the second terminal 112 may perform a fine sensing ("feature detection") of the received signal in the in-band. For example, the second base station 111 or the second terminal 112 may analyze the received signal to determine whether the received signal includes the signal of the first communication system 120. For example, the second base station 111 or the second terminal 112 may perform the feature detection using a matched filter. Depending on the feature detection result, the second base station 111 or the second terminal 112 may determine whether to continuously use the in-band or to continuously perform the data communication.

The second base station 111 or the second terminal 112 may temporarily suspend the data communication in order to more accurately perform the feature detection for the received signal. A time where the data communication is suspended in order to perform the feature detection is referred to as a "quiet time." Due to the quiet time, it may not be possible to appropriately support a user that demands a high Quality of Service ("QoS"). As described later, the cognitive radio communication device may provide the high QoS by reducing or eliminating the quiet time that is required to perform the feature detection.

Figure 2:
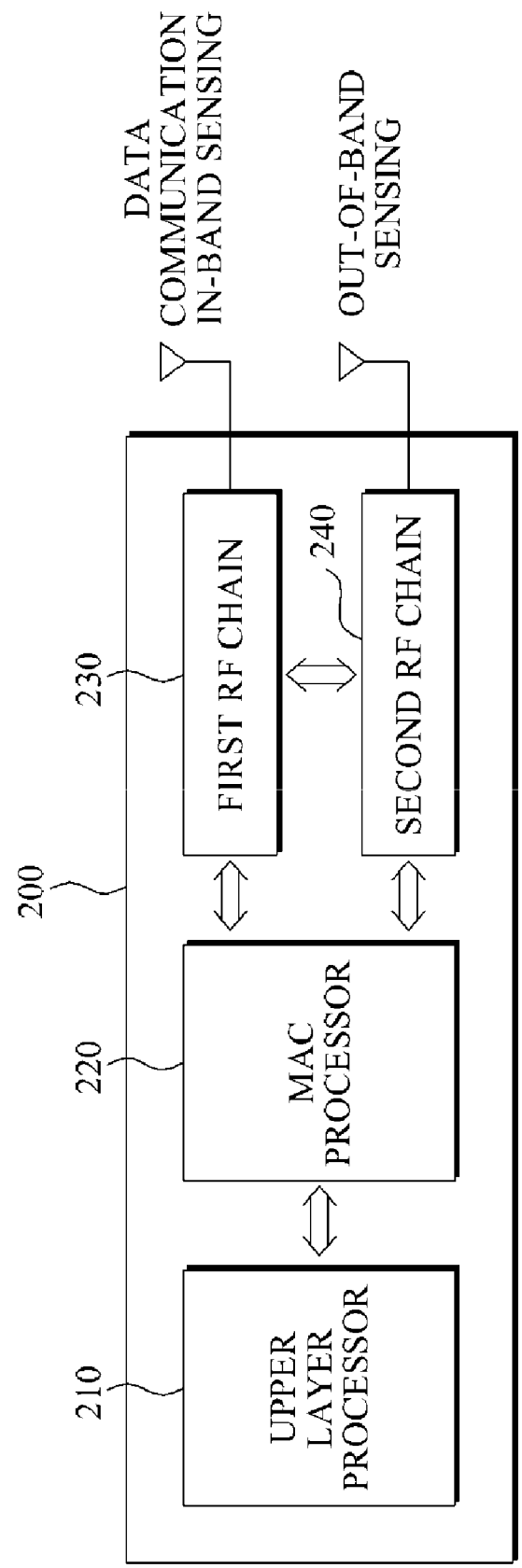
FIG. 2 is a diagram illustrating an exemplary cognitive radio communication device that includes a first radio frequency chain to perform a data communication and to perform a sensing in an in-band and a second radio frequency chain to perform sensing in an out-of-band.

FIG. 2 illustrates an exemplary cognitive radio communication device 200 that includes a first radio frequency ("RF") chain 230 to perform a data communication and a sensing in an in-band and a second RF chain 240 that performs a sensing in an out-of-band. The first RF chain 230 performs the data communication and the sensing of a signal of a first communication system in the in-band. The second RF chain 240 performs the sensing of the signal of the first communication system in the out-of-band in order to attain a backup channel ("backup frequency resource"). Accordingly, where the signal of the first communication system is sensed in the in-band, the in-band may be changed to the backup channel.

A media access control ("MAC") processor 220 performs a control resource management or a scheduling for various operations that are performed in the first RF chain 230 and the second RF chain 240. The MAC processor 220 transmits and receives various types of messages to and from an upper layer processor 210. While performing the data communication, the first RF chain 230 may periodically or aperiodically perform an energy detection of the received signal in the in-band. Where the energy of the received signal is greater than a predetermined reference level ("threshold"), the first RF chain 230 may suspend the data communication and performs a feature detection of the received signal. In this instance, due to a quiet time where the first RF chain 230 suspends the data communication in order to perform the feature detection, a QoS may deteriorate.

Figure 3:
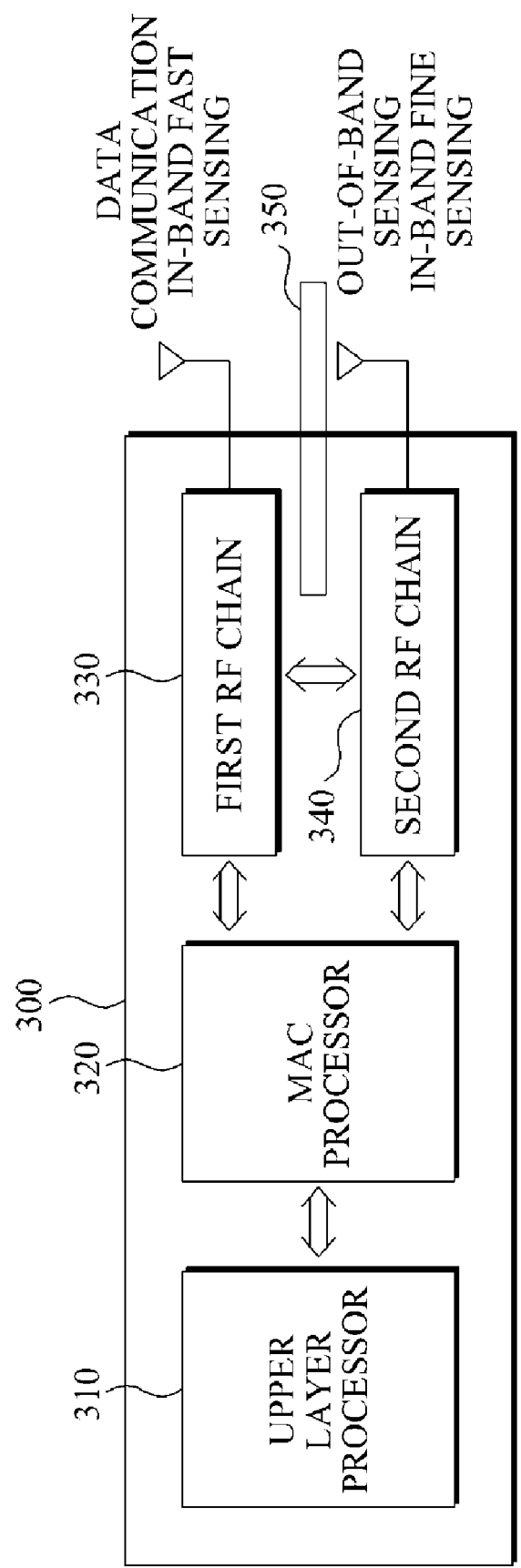
FIG. 3 is a diagram illustrating an exemplary cognitive radio communication device that includes a first radio frequency chain to perform a data communication and a fast sensing in an in-band and a second radio frequency chain to perform fine sensing in the in-band and a sensing in an out-of-band.

FIG. 3 illustrates an exemplary cognitive radio communication device 300 that includes a first RF chain 330 to perform a data communication and a fast sensing in an in-band and a second RF chain 340 to perform fine sensing in the in-band and a sensing in an out-of-band. The cognitive radio communication device 300 includes an upper layer processor 310, a MAC processor 320, the first RF chain 330, and the second RF chain 340.

The first RF chain 330 performs the data communication and performs the fast sensing ("energy detection") in the in-band. For example, while performing the data communication, the first RF chain 330 may periodically or aperiodically perform the energy detection of the received signal in the in-band. Where the energy of the received signal is greater than a reference level, the first RF chain 330 may not suspend the data communication in order to perform a fine sensing ("feature detection").

In place of the first RF chain 330, the second RF chain 340 may perform the feature detection of the received signal in the in-band. The second RF chain 340 may provide the feature detection result to the first RF chain 330 via the upper layer processor 310 or the MAC processor 320.

The cognitive radio communication device 300 may further include a separation module 350. Interference may occur between the first RF chain 330 and the second RF chain 340. The interference may interrupt the feature detection by the second RF chain 340. In particular, a transmission signal of the first RF chain 330 may cause interference in the second RF chain 340.

The separation module 350 physically separates the first RF chain 330 and the second RF chain 340 and thereby enables the second RF chain 340 to more accurately perform the feature detection. The first RF chain 330 may perform the data communication independent of actions by the second RF chain 340 (i.e., actions such as performing a feature detection).

Where the second RF chain 340 does not perform the feature detection in the in-band, the second RF chain 340 may perform a sense of the signal of the first communication system in the out-of-band in order to attain a backup channel. Where the signal of the first communication system is detected in the in-band through the feature detection, the in-band may be changed to the attained backup channel.

Figure 4:
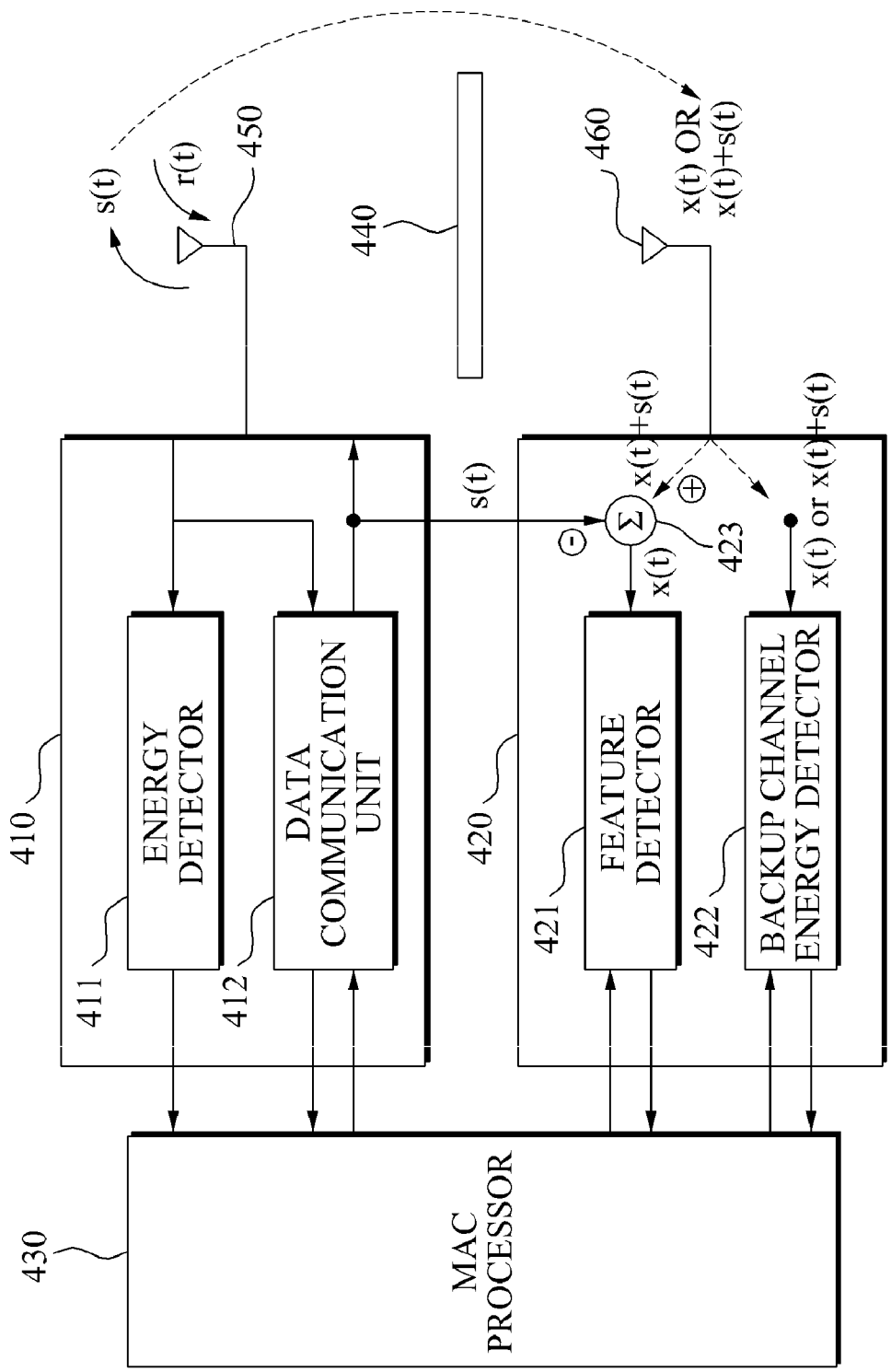
FIG. 4 is a diagram illustrating a configuration of an exemplary cognitive radio communication device.

FIG. 4 illustrates a detailed configuration of an exemplary cognitive radio communication device. A first RF chain 410 of the cognitive radio communication device includes an energy detector 411 and a data communication unit 412. A second RF chain 420 includes a feature detector 421 and a backup channel energy detector 422.

The data communication unit 412 performs a data communication using all or a portion of at least one frequency band allocated to a first communication system. Here, s(t) denotes a transmission signal that is generated by the data communication unit 412 and is transmitted via an antenna 450. Although a separation module 440 is provided, s(t) may be received via an antenna 460 of the second RF chain 420.

The first communication system has priority with respect to the in-band that is used by the data communication unit 412. Thus, the cognitive radio communication device performs a sense of a signal of the first communication system.

The energy detector 411 performs an energy detection for a received signal r(t) that is received via the antenna 450 in the in-band. The energy detector 411 compares the detected energy of the received signal r(t) with a predetermined threshold to perform the energy detection of the received signal r(t). As described below, the predetermined threshold may be appropriately adjusted according to a probability that interference occurs in the first communication system.

The detected energy of the received signal r(t) by energy detector 411 is provided to a MAC processor 430. Specifically, where the detected energy of the received signal r(t) is greater than the threshold, the feature detector 421 performs an in-band feature detection of a received signal x(t) or a received signal x(t)+s(t) as transmitted from the antenna 460 of the second RF chain 420. Here, x(t) denotes an unknown signal that becomes a target of the feature detection.

In a first situation, where the signal s(t) is transmitted from the antenna 450, the received signal x(t)+s(t) is transmitted from the antenna 460. Information associated with the signal s(t) is provided to the second RF chain 420. Where the detected energy of the received signal r(t) is greater than the predetermined threshold, and the signal s(t) is transmitted from the antenna 450, the MAC processor 430 provides the received signal x(t)+s(t) from the antenna 460 to an adder 423. The adder 423 subtracts the received signal s(t) from the received signal x(t)+s(t) and provides a resulting signal x(t) to the feature detector 421.

In a second situation, the received signal s(t) is not transmitted from the antenna 450, the received signal x(t) is transmitted from the antenna 460. Where the detected energy of the received signal r(t) is greater than the predetermined threshold, the MAC processor 430 provides the received signal x(t) from the antenna 460 to the feature detector 421.

The feature detector 421 determines whether the received signal x(t) includes the signal of the first communication system in the in-band. To make this determination, the feature detector may use, for example, a matched filter. The detection result of the feature detector 421 is provided to the MAC processor 430. The MAC processor 430 determines whether to continuously use the in-band or to change the in-band to a backup channel.

An exemplary cognitive radio communication device includes an RF chain to perform a feature detection and another RF chain to perform a data communication, and thereby reduces or eliminates a quiet time.

In order to attain the backup channel, the backup channel energy detector 422 performs the energy detection for the received signal in the out-of-band. Where the energy of the received signal r(t) from the antenna 450 is less than or equal to the predetermined threshold, the backup channel energy detector 422 performs the energy detection for the received signal x(t) or the received signal x(t)+s(t) in the out-of-band.

Figure 5:
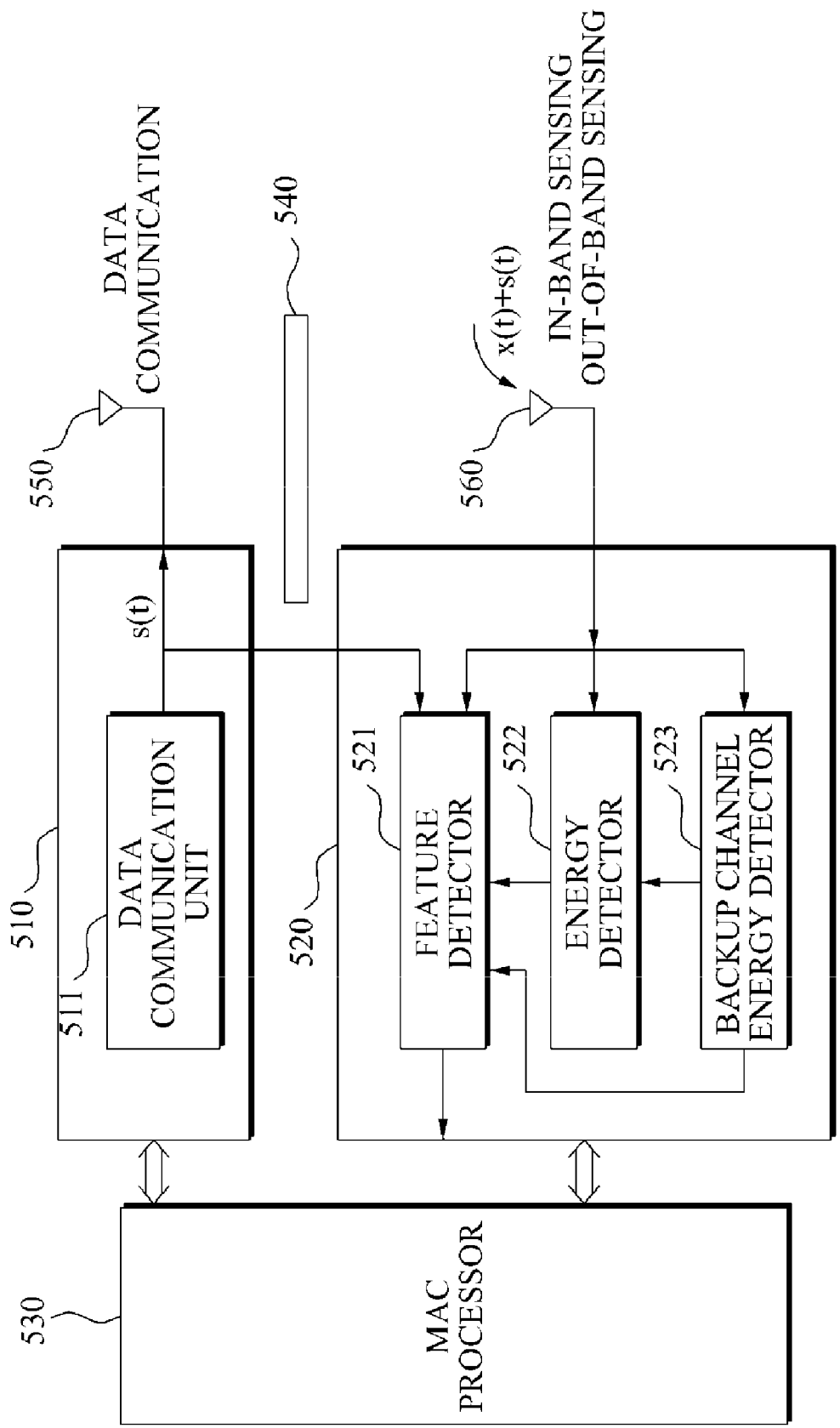
FIG. 5 is a diagram illustrating an exemplary cognitive radio communication device that includes a first RF chain to perform a data communication and a second RF chain to perform sensing in both an in-band and an out-of-band.

FIG. 5 illustrates an exemplary cognitive radio communication device that includes a first RF chain 510 to perform a data communication and a second RF chain 520 to perform a sensing in both an in-band and an out-of-band. The first RF chain 510 includes a data communication unit 511. The second RF chain 520 includes a feature detector 521, an energy detector 522, and a backup channel energy detector 523.

Unlike the exemplary cognitive radio communication device illustrated in FIG. 4, the second RF chain 520 of the cognitive radio communication device illustrated in FIG. 5 performs a sensing in both the in-band and the out-of-band.

Where a transmission signal s(t) generated by the data communication unit 511 is transmitted via an antenna 550, a received signal x(t)+s(t) is transmitted via an antenna 560, despite the existence of a separation module 540.

The energy detector 522 detects an energy of the received signal x(t)+s(t) from the antenna 560 in the in-band. In a first situation, where the detected energy of the received signal x(t)+s(t) is greater than a predetermined threshold, the feature detector 521 performs a feature detection of the received signal x(t)+s(t) in the in-band. In a second situation, where the energy of the received signal x(t)+s(t) is less than or equal to the predetermined threshold in the in-band, the backup channel energy detector 523 performs the energy detection of the received signal x(t)+s(t) in the out-of-band in order to attain a backup channel. In this instance, the feature detector 521 may perform the feature detection for the received signal x(t)+s(t) in the out-of-band depending on the detection result of the backup channel energy detector 523.

Depending on the detection result of the feature detector 521, the MAC processor 530 performs a scheduling of either the attained backup channel or the in-band.

Figure 6:
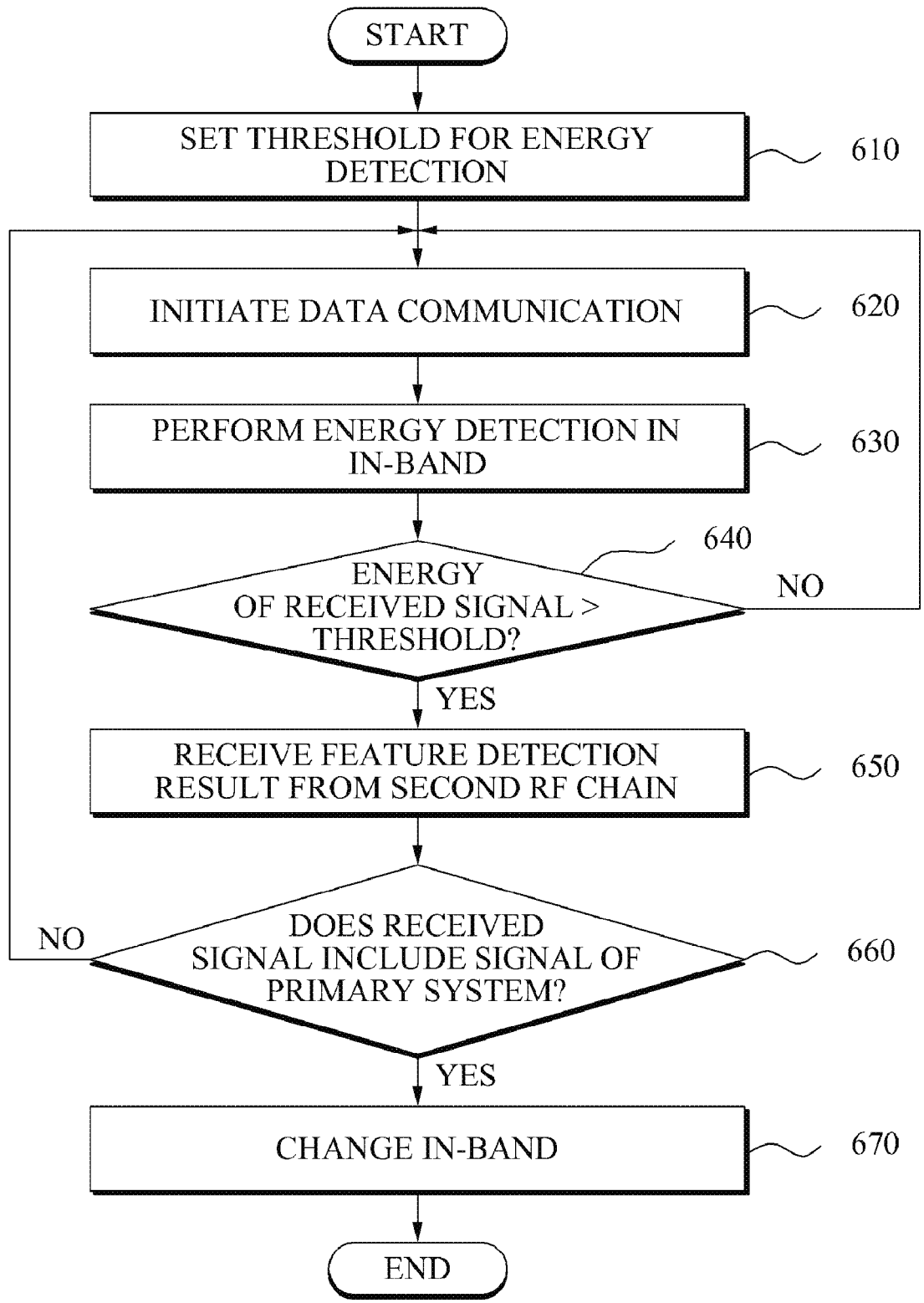
FIG. 6 is a flowchart illustrating an exemplary operation of the first RF chain of FIG. 3.

FIG. 6 is a flowchart illustrating an exemplary operation of the first RF chain 330 of FIG. 3. In operation 610, the first RF chain 330 sets a threshold to perform an energy detection for a received signal. The threshold is adjusted according to a probability that interference occurs in a first communication system. It is assumed that $P_{MD}$ is a probability that interference occurs in the first communication system where a single RF chain simultaneously performs both a data communication and a feature detection whereby a quiet time is required. Also, it is assumed that $P'_{MD}+1/n$ is a probability that interference occurs in the first communication system where the first RF chain 330 performs the data communication and a second RF chain performs a feature detection whereby the quiet time is not required. In such case, $1/n$ is a probability that a signal of the first communication system appears while performing a sensing process n times.

So that a cognitive radio communication device may attain a better performance, a threshold $\lambda$ may be determined to satisfy the following Equation 1:

$$P_{MD}(\lambda) > P'_{MD}(\lambda) + \frac{1}{n} P_{MD}(\lambda) > P'_{MD}(\lambda) + \frac{1}{n}. \quad (1)$$

In operation 620, the first RF chain 330 initiates the data communication. Information associated with a transmission signal of the first RF chain 330 is provided to the second RF chain.

In operation 630, while performing the data communication, the first RF chain 330 performs an energy detection in an in-band using the determined threshold $\lambda$. In operation 640, the first RF chain 330 determines whether the energy of a received signal is greater than the threshold $\lambda$. Where the energy of the received signal is less than or equal to the threshold $\lambda$, the first RF chain 330 sequentially performs operations 620 through 640.

Where the energy of the received signal is greater than the threshold $\lambda$, the first RF chain 330 informs the second RF chain that the energy of the received signal is greater than the threshold $\lambda$. In this instance, the second RF chain performs a feature detection for the received signal and provides the feature detection result to the first RF chain 330. In operation 650, the first RF chain receives the feature detection result.

In operation 660, the first RF chain 330 verifies whether the received signal includes the signal of the first communication system based on the feature detection result. Where the received signal does not include the signal of the first communication system, operations 620 through 650 are sequentially performed.

Where the received signal does include the signal of the first communication system, a MAC processor commands changing of the in-band and the first RF chain changes the in-band in response to the command in operation 670.

Figure 7:
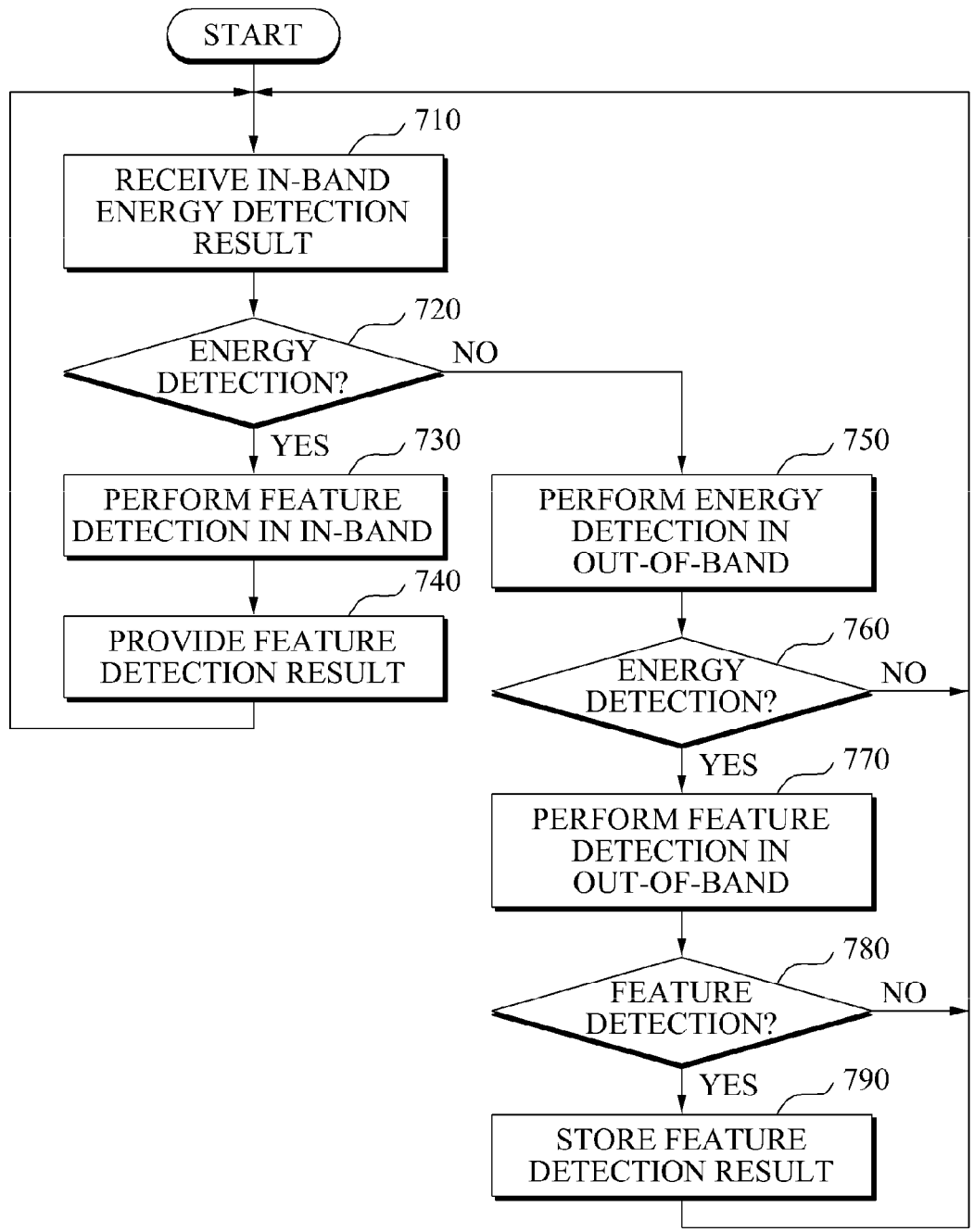
FIG. 7 is a flowchart illustrating an exemplary operation of the second RF chain of FIG. 3.

FIG. 7 is a flowchart illustrating an exemplary operation of the second RF chain 340 of FIG. 3. The second RF chain 340 receives an in-band energy detection result from a first RF chain in operation 710. In operation 720, the second RF chain 340 determines whether the in-band energy of a received signal is greater than a threshold based on the energy detection result.

In operation 730, where the detected energy of the received signal is greater than the threshold in the in-band, the second RF chain 340 performs a feature detection in the in-band. In such case, the second RF chain 340 verifies a transmission signal of the first RF chain and thereby more accurately performs the feature detection. In operation 740, the second RF chain 340 provides the feature detection result to the first RF chain.

Where the detected energy of the received signal is less than or equal to the threshold in the in-band, the second RF chain 340 performs an energy detection in an out-of-band in order to attain a backup channel in operation 750.

Where the detected energy of the received signal is less than or equal to the threshold in the out-of-band in operation 760, operation 710 is performed again. Where the detected energy of the received signal is greater than the threshold in the out-of-band, the second RF chain 340 performs the feature detection in the out-of-band in operation 770.

In operation 780, the second RF chain 340 determines whether the received signal includes a signal of a first communication system in the out-of-band. Where the received signal does not include the signal of the first communication system in the out-of-band, operation 710 is performed again.

Where the received signal does include the signal of the first communication system in the out-of-band, the second RF chain 340 stores, in a database, information associated with the feature detection result such as a frequency band of the signal of the first communication system, a signal strength of the first communication system, and the like in operation 790.

A MAC processor attains, as the backup channel, a portion of the out-of-band based on the feature detection result and performs a scheduling for the backup channel and the out-of-band.

An exemplary cognitive radio communication device may include a first RF chain to perform a data communication and a second RF chain to perform a feature detection for a received signal and thereby continuously perform the data communication even while performing the feature detection.

An exemplary cognitive radio communication device also may continuously perform an independent data communication regarding whether a feature detection is performed and thereby may reduce or eliminate a quiet time and also may support a high QoS of a user.

An exemplary cognitive radio communication device also may include a separation module to reduce interference occurring between a first RF chain and a second RF chain and thereby more accurately perform an energy detection or a feature detection for a received signal.

An exemplary cognitive radio communication device also may provide information associated with a transmission signal of a first RF chain to a second RF chain and thereby enable the second RF chain to more accurately perform an energy detection or a feature detection.

The methods described above including operating a first RF chain and a second RF chain in an exemplary cognitive radio communication device may be recorded, stored, or fixed in one or more computer-readable media that includes program instructions to be implemented by a computer to cause a processor to execute or perform the program instructions. The media may also include, independent of or in combination with the program instructions, data files, data structures, and the like. The media and program instructions may be those specially designed and constructed, or they may be of the kind well-known and available to those having skill in the computer software arts. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the methods and/or operations described above, or vice versa.

A number of exemplary embodiments have been described above. Nevertheless, it will be understood that various modifications may be made. For example, suitable results may be attained if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio communication device comprising:
a first radio frequency chain comprising a data communication unit to communicate in an in-band and an energy detector to detect an energy of a received signal in the in-band; and
a second radio frequency chain comprising a feature detector to perform a feature detection of the received signal in the in-band.

2. The cognitive radio communication device of claim 1, wherein the data communication unit communicates independently of the feature detector.

3. The cognitive radio communication device of claim 1, wherein
the feature detector receives information associated with a transmission signal transmitted by the data communication unit, and
the feature detector extracts the transmission signal from the received signal and performs the feature detection of the received signal.

4. The cognitive radio communication device of claim 1, wherein the second radio frequency chain further comprises a backup channel energy detector to detect an energy of the received signal in an out-of-band, and to attain a backup channel.

5. The cognitive radio communication device of claim 4, wherein detection by the feature detector of the received signal in the out-of-band depends on the energy detection of the received signal in the out-of band by the backup channel energy detector.

6. The cognitive radio communication device of claim 1, wherein detection by the feature detector of the received signal in the in-band depends on an energy detection result determined by the energy detector of the received signal in the in-band.

7. The cognitive radio communication device of claim 1, wherein:
the energy detector compares a predetermined threshold with an energy of the received signal, and
the predetermined threshold is adjustable.

8. The cognitive radio communication device of claim 7, wherein the threshold is adjusted according to a probability of interference in a first communication system.

9. The cognitive radio communication device of claim 1, further comprising:
a media access control (MAC) processor to schedule the in-band or a pre-attained channel based on a feature detection result determined by the feature detector of the received signal in the in-band.

10. The cognitive radio communication device of claim 9, wherein the MAC processor schedules a change from the in-band to the pre-attained channel where the feature detector detects a signal of a first communication system in the received signal.

11. The cognitive radio communication device of claim 1, further comprising:
a separation module to physically separate the first radio frequency chain and the second radio frequency chain to prevent interference from occurring between the first radio frequency chain and the second radio frequency chain.

12. The cognitive radio communication device of claim 1, wherein the data communication unit of the first radio frequency chain is configured to transmit data in the in-band and the feature detector of the second radio frequency chain is configured to perform the feature detection in the in-band, simultaneously.

* * * * *